United States Patent Office 3,309,359
Patented Mar. 14, 1967

3,309,359
N-MONO-ACYL-5-FLUOROCYTOSINE
DERIVATIVES AND PROCESS
Robert Duschinsky, Essex Fells, and Max Hoffer, Nutley,
N.J., assignors to Hoffmann-La Roche Inc., Nutley,
N.J., a corporation of New Jersey
No Drawing. Filed Oct. 22, 1965, Ser. No. 502,586
13 Claims. (Cl. 260—211.5)

This application is a continuation-in-part of application Ser. No. 191,438 filed May 1, 1962, and now abandoned.

This invention relates, in general, to a new and improved method for producing 1-β-D-2′-deoxyribofuranosyl-5-fluorocytosine, or, as it is often referred to, 2′-deoxy-5-fluorocytidine. More particularly, the invention relates to a method by which 2′-deoxy-5-fluorocytidine and its α-anomer, that is, 1-α-D-2′-deoxyribofuranosyl-5-fluorocytosine, can be separately obtained and to novel intermediates in the preparation.

2′-deoxy-5-fluorocytidine is a known compound which has recognized utility as an anti-tumor agent. Additionally, it is disclosed in the art that 2′-deoxy-5-fluorocytidine is useful as an anti-bacterial and anti-fungal agent. Processes for the production of 2′-deoxy-5-fluorocytidine have previously been described in the art.

In one of its aspects, the present invention relates to a new and improved method for producing the aforesaid 2′-deoxy-5-fluorocytidine and its α-anomer.

In another aspect, the invention relates to a procedure whereby 2′-deoxy-5-fluorocytidine can be obtained substantially free of its α-anomer.

In still another aspect, the invention relates to the novel N-mono-acyl-5-fluorocytosine compounds which are produced as intermediates in the first step of the present process.

Additionally, the invention relates to the N,3′,5′-triacyl-5-fluoro-2′-deoxycytidine compounds which are also obtained as intermediates in the disclosed process.

In a further and more particular aspect, the invention relates to novel N-toluoyl-5-fluoro-2′-deoxycytidine.

The process of this invention is illustrated graphically in the diagrammatic flow sheet, which follows hereinafter.

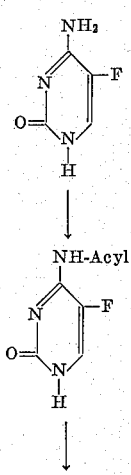

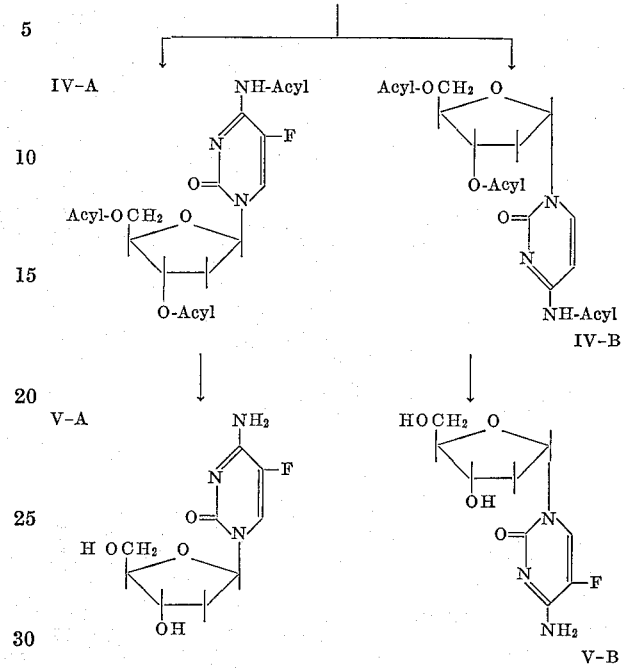

In the first step of the present process, 5-fluorocytosine (I) is reacted with an acylating agent to form the corresponding N-mono-acyl-5-fluorocytosine (II). The latter class of compounds has not previously been disclosed in the art. Suitable acylating agents which can be used in the preparation of compounds of Formula II are, for example, aliphatic acid anhydrides such as acetic acid anhydride, propionic acid anhydride, pivalic acid anhydride and the like; aroyl halides such as benzoyl chlorides and benzoyl chlorides in which one or more of the hydrogens in the benzene ring has been replaced by a functional group such as lower alkyl, lower alkoxy, halo, trihalomethyl, nitro, carboxy, carb-alkoxy and the like. Thus, the novel compounds of Formula II encompassed by this invention include compounds of Formula II wherein acyl represents either a lower aliphatic acyl or an aroyl group preferably an unsubstituted benzoyl or a benzoyl bearing a ring substituent selected from the group consisting of lower alkyl, lower alkoxy, halo, trihalomethyl, nitro, carboxy, carbalkoxy and the like. When only a single substituent is present in the benzoyl group, it is preferably in the para position. Certain of the N-mono-acyl-5-fluorocytosines, for example, N-toluoyl-5-fluorocytosine and N-benzoyl-5-fluorocytosine, are easily hydrolyzed with acid to form 5-fluorouracil. The latter compound is known. It is useful as an anti-tumor agent and as a germicidal agent. Thus, in addition to having utility as an intermediate in the present process, the properties of certain of the N-mono-acyl-5-fluorocytosine compounds are such that, in biological systems, they may act as precursors for 5-fluorouracil. The novel 5-fluorocytosine derivatives of Formula II have also been found to possess useful anti-microbial properties. More particularly, they are useful as anti-fungal agents in the treatment of candidiasis.

In carrying out the acylation step of the present process, one may use any of the well-known acylating agents of the art as indicated above. These include, for example, acetic anhydride, benzoyl chloride, p-toluoyl chloride, pivaloyl anhydride, etc. In a preferred embodiment of the invention, 5-fluorocytosine is acylated by reacting it with p-toluoyl chloride. Acylation is accomplished merely by mixing 5-fluorocytosine with the acylating agent, at a temperature up to reflux temperature, in the presence of an inert organic solvent. Pyridine, dimethylformamide, etc. have been found to be well suited for use as the solvent. The quantity of acylating agents used in carrying out this step of the process may be varied. However, one should use a ratio of at least one mole of acylating agent for each mole of 5-fluorocytosine present in the reaction mixture. A small excess quantity of acylating agent can be used, however, if desired.

In the second step of the present process, the N-mono-acyl-5-fluorocytosine (II) is reacted, preferably in the presence of a solvent, with a mercury compound to form the monomercury salt thereof. In carrying out this step, any suitable mercury salt can be employed. Preferably, however, mercuric chloride or mercuric acetate is used. As the solvent, one may use any inert organic solvent in which both the N-mono-acyl-5-fluorocytosine and the mercury salt are soluble. In the preferred embodiment of the invention, however, dimethylformamide is the solvent used. The desired mercury compound is obtained, generally in the form of a precipitate, simply by mixing the reactants at room temperature. After its formation, the precipitated monomercury salt of the N-mono-acyl-5-fluorocytosine is isolated from the reaction mixture, e.g., by filtration or centrifugation.

In the third step of the process, the mercury salt of the N-mono-acyl-5-fluorocytosine is reacted with an equimolar quantity of a 2'-deoxy-3',5'-diaroyl-D-ribofuranosyl halide, as, for example, 2'-deoxy-3',5'-di-O-p-toluoyl-D-ribofuranosyl chloride, 2'-deoxy-3',5'-di-p-chlorobenzoyl-D-ribofuranosyl chloride, etc. The product, thus obtained, contains a mixture of N,3',5'-triacyl-5-fluoro-2'-deoxycytidine (IV A) and its α-anomer (IV B). More particularly, the product, thus obtained contains a mixture of N-monoacyl-3',5'-diaroyl-5-fluoro-2'-deoxycytidine and its α-anomer.

The aforesaid third step of the process is carried out while the mercury salt of N-mono-acyl-5-fluorocytosine is suspended in a suitable inert, water-immiscible organic solvent. It has been found that solvents such as toluene, carbon tetrachloride, xylene, benzene, etc., are well suited for use as the suspending medium. The desired reaction may be accomplished merely by adding the 2'-deoxy-3',5'-diaroyl-D-ribofuranosyl halide to the mercury salt suspension and stirring the mixture, thus obtained, at room temperature.

N,3',5'-triacyl-2'-deoxy-5-fluorocytidine (IV–A) and its α-anomer (IV–B) are subsequently isolated, as separate entities, from the reaction mixture obtained in the third step of the process. The properties and characteristics of the respective anomers will suggest, to a person skilled in the art, the maner in which this result can be most conveniently accomplished. Thus, for example, where the reaction product contains a mixture of the α- and β-anomers of N-acetyl-3',5'-di-p-toluoyl-5-fluorodeoxycytidine, or where the product contains a mixture of the α- and β-anomers of N-pivaloyl-3',5'-di-p-toluoyl-5-fluorodeoxycytidine, the following procedure has been found to be a suitable and convenient means for separating the anomers. The reaction mixture from the third step of the process is first treated with a saturated aqueous solution of sodium chloride. The aqueous layer is thereafter separated from the water-immiscible, inert organic solvent layer. The organic solvent layer is then evaporated to syrupy consistency, following which the residual syrup is diluted with ethyl acetate and ether, seeded and allowed to crystallize. The crystalline product is slurried in a mixture of pyridine and acetone, and the slurry, thus obtained, is filtered. The β-anomer remains on the filter while the α-anomer can be recovered from the filtrate by any suitable means.

Where, however, the reaction product of the third step of the process contains, for example, N,3',5'-tri-p-toluoyl-5-fluoro-2'-deoxycytidine, that is, the β-anomer, and 1-α - D - (3',5'-di-O-toluoyl-N-toluoyl-2'-deoxyribofuranosyl)-5-fluorocytosine, that is, the α-anomer, a modified procedure for separating the former from the latter is employed. In this method, the reaction product of the third step is subjected to repeated washings using large quantities of aqueous potassium iodide solution. Some crystallization of the β-anomer occurs during the operation and these crystals can be recovered, for example, by filtration. The filtrate is then evaporated to a syrupy consistency. Dilution of this syrup with boiling methanol yields an additional crop of the crystalline β-anomer.

After the crystalline β-anomer has been isolated by the above-described procedure, evaporation of the methanol mother liquor and subsequent dissolution of the residue in carbon tetrachloride yields a crop of waxy crystals which are difficult to filter. Upon trituration with ether, these crystals become easily filtrable. The crystalline product which is then recovered by filtration can be purified by first boiling it with ether, separating it from the solvent after cooling, and then boiling it with methanol and separating it once again from the solvent after cooling. The crystalline product, thus obtained, is the α-anomer, namely, 1-α-D-(3',5'-di-O-toluoyl-N-toluoyl-2'-deoxyribofuranosyl)-5-fluorocytosine.

In the fourth step of the process, the β-anomer of N,3',5'-triacyl-5-fluoro-2'-deoxycytidine which is isolated from the reaction mixture of the third step, as well as the α-anomer thereof, are separately deacylated by alkaline hydrolysis. For example, complete deacylation of N, 3',5'-tri-p-toluoyl-5-fluoro-2'-deoxycytidine, and of 1-α-D - (3',5'-di-O-toluoyl-N-toluoyl-2'-deoxyribofuranosyl)-5-fluorocytosine, can be accomplished by conventional procedures. Preferably, complete deacylation is carried out by heating the compounds at reflux temperature with an alkali metal alkoxide or alcoholic ammonia. Complete deacylation of α- and β-anomers of N-acetyl-3',5'-di-p-toluoyl-5-fluoro-2'-deoxycytidine and of the α- and β-anomers of N-pivaloyl-3',5'-di-p-toluoyl-5-fluoro-2'-deoxycytidine is preferably accomplished merely by mixing the named compounds with an alkali metal alkoxide or alcoholic ammonia at room temperature. The α- and β-anomers of the N,3',5'-tri-p-toluoyl compound can also be deacylated at room temperature using a large excess of alkali and/or by increasing the reaction time.

It has been found, moreover, that when the deacylation of N,3',5'-tri-p-toluoyl-5-fluoro-2'-deoxycytidine is carried out under moderate conditions only those acyl groups which are attached to the sugar portion of the molecule are removed. Thus, where N,3',5'-tri-p-toluoyl-5-fluoro-2'-deoxycytidine is mixed at room temperature, or at a temperature below room temperature, with an alkali metal alkoxide or with alcoholic ammonia, N-p-toluoyl-5-fluoro-2'-deoxycytidine is produced. Where the α-anomer of N,3',5'-tri-p-toluoyl-5-fluoro-2'-deoxyvytidine is similarly treated, the α-anomer of N-p-toluoyl-5-fluoro-2'-deoxycytidine is produced. Such derivatives are previously undisclosed in the art. They are easily hydrolyzed, by acid, to 5-fluoro-2'-deoxyuridine, a known antifungal and antibacterial agent and its α-anomer. Thus, in addition to being intermediates from which 5-fluoro-2'-deoxyuridine and its α-anomer can be prepared, these compounds, in biological systems, may act as precursors for 5-fluoro-2'-deoxyuridine and its α-anomer.

For a fuller understanding of the nature and objects of this invention, reference may be had to the following ex-

EXAMPLE 1

Preparation of N-p-toluoyl-5-fluorocytosine 12.9 grams (0.1 mole) of 5-fluorocytosine were suspended in 100 ml. of pyridine. To this suspension 17.0 grams (14 ml., 0.11 mole) of p-toluoyl chloride were added. Upon mixing, the temperature of the reaction mixture rose spontaneously to about 45° C. The reaction mixture was refluxed for a period of about 5 hours, following which it was permitted to stand at room temperature overnight. Crystallization of N-p-toluoyl-5-fluorocytosine occurred. Any excess p-toluoyl chloride present in the reaction mixture was destroyed by adding 50 ml. of ethanol to the mixture and stirring same therewith for a period of about 20 minutes.

The crystalline N-p-toluoyl-5-fluorocytosine was separated from the reaction mixture by filtration and washed with ethanol and subsequently with ether. Thereafter, the crystals were dried in vacuo at a temperature of about 60° C. There was obtained 18.35 grams of N-p-toluoyl-5-fluorocytosine melting at 250–251° C., with decomposition.

Evaporation of the mother liquor to dryness, trituration of the residue with ethanol, removal of the ethanol by evaporation and, finally, suspension of the residue in 20 ml. of ether and 20 ml. of water yielded a second crop of crystals amounting to 1.56 grams.

The total yield of N-p-toluoyl-5-fluorocytosine was 19.91 grams or 80.5% of theory. A sample of this product recrystallized from about 300 volumes of 90% ethanol analyzed as follows: melting point 257–258° C., with decomposition.

$\lambda_{max.}^{EtOH}$ 265, 325 m$\mu$ ($\xi$ 12,700, 17,000). $\lambda_{min.}^{EtOH}$ 235,290 m$\mu$ ($\xi$ 8,000,9,400).

*Analysis.*—Calculated for $C_{12}H_{10}FN_3O_2$: C, 58.30; H, 4.08; N, 17.00; F, 7.68. Found: C, 58.43; H, 4.41; N, 17.10; F, 7.51.

Preparation of monomercury N-p-toluoyl-5-fluorocytosine

A solution of 8.97 grams (0.0281 mole) of mercury acetate in 75 ml. of boiling ethanol was added to a solution of 6.95 grams of N-p-toluoyl-5-fluorocytosine dissolved in 75 ml. of dimethylformamide which was heated to a temperature of about 100° C. Upon mixing these solutions, precipitation occurred. To insure completeness of precipitation, 800 ml. of ether were added to the reaction system. Centrifugation, washing with ether and drying at a temperature of about 35° C. in vacuo yielded 11.80 grams (94.4% of theory) of the monomercury salt of N-p-toluoyl-5-fluorocytosine.

The monomercury salt, thus obtained, analyzed as follows:

Calculated for $C_{12}H_8N_3O_2FHg$: F, 4.26; N, 9.43. Found: F, 4.07; N, 9.13.

Preparation of N,3′,5′-tri-p-toluoyl-5-fluoro-2′-deoxycytidine

A suspension of 11.75 grams (0.0264 mole) of monomercury N-p-toluoyl-5-fluorocytosine in 350 ml. of toluene was dehydrated by distilling off about 40 ml. of toluene. The suspension was thereafter cooled to room temperature and 22.3 grams (0.0528 mole) of 3′,5′-di-O-p-toluoyl-D-2′-deoxyribofuranosyl chloride were added thereto with stirring. The temperature of the reaction mixture rose slightly and a clear solution formed within about 5 minutes. At the end of about 35 minutes, the crystalline product commenced to separate from solution. At this point, 100 ml. of a 15% aqueous potassium iodide solution was dropped into the mixture and the mixture was stirred for a period of about 20 minutes. The dense crystals which formed were separated from the solution and washed with water and ether. Thereafter, the crystals were dried in vacuo at a temperature of about 60° C. Upon trituration of these crystals with 75 ml. of boiling ethanol, 5.36 grams of the N,3′,5′-tri-p-toluoyl-5-fluoro-2′-deoxycytidine melting at 217° C. were obtained. Recrystallization of the product from 400 ml. of butyl acetate yielded 4.25 grams of clustered needles melting at 234–235° C.

$\lambda_{max.}^{CH_2Cl_2}$ 243, 232 m$\mu$ ($\xi$ 37,500, 26,500), $\lambda_{min.}^{CH_3Cl_2}$ 290 m$\mu$ ($\xi$ 8,490). $[\alpha]_D^{25} = +5.5°$. (c 1.0 in dimethylformamide).

A second crop of crystals was obtained by evaporation of the toluene, ethanol and butyl acetate mother liquors. The total yield of N,3′,5′-tri-p-toluoyl-5-fluoro-2′-deoxycytidine, thus obtained, was 5.90 grams (40% of theory). This product analyzed as follows:

Calculated for $C_{33}H_{30}FN_3O_7$: C, 66.10; H, 5.04; F, 3.17; N, 7.01. Found: C, 66.16; H, 5.03; F, 3.01; N, 6.73, 6.90.

Preparation of 5-fluoro-2′-deoxycytidine 2.24 grams of N,3′,5′-tri-p-toluoyl-5-fluoro-2′-deoxycytidine were suspended in 25 ml. of methanol containing a small amount of phenophthalein. The suspension was heated at reflux temperature. During refluxing, 2.7 ml. of 0.85 N sodium methoxide was added, drop by drop, over a period of 15 minutes. Refluxing was continued for a period of about one hour.

The solution was then neutralized with 2.7 ml. of 0.85 N alcoholic hydrochloric acid and evaporated in vacuo to yield a crystalline syrup. This syrup was taken up in butyl alcohol, following which the solvent was removed once again by evaporation. The residue was dried in vacuo at a temperature of about 60° C. Thereafter, the residue was taken up in 80 ml. of boiling butanol and the cloudy solution, thus obtained, was filtered through fuller's earth and charcoal. Upon cooling, a crystalline product separated. The crystals were removed from the mother liquor by filtration. There was obtained 0.424 gram of 5-fluoro-2′-deoxycytidine melting at 194–196° C.

A second crop of 0.226 gram of 5-fluoro-2′-deoxycytidine melting at 196–197° C. was obtained by evaporating the mother liquor, dehydrating the system with toluene and crystallizing the product from butanol.

EXAMPLE 2

This example is included to demonstrate a method for separating and recovering both N,3′,5′-tri-p-toluoyl-5-fluoro-2′-deoxycytidine and its α-anomer, namely, 1-α-D-(3′,5′ - di - O-toluoyl-N-toluoyl-2′-deoxyribofuranosyl)-5-fluorocytosine, from a mixture containing same.

In this example, 36.3 grams of the monomercury salt of N-p-toluoyl-5-fluorocytosine (prepared by the method described in Example 1) was reacted with 3′,5′-di-O-p-toluoyl-D-2′-deoxyribofuranosyl chloride, while suspended in 750 ml. of toluene. This preparation was carried out using the procedure described in Example 1.

The product, thus obtained was washed repeatedly using 800 ml. of 30% potassium iodide solution and 4000 ml. of water. The N,3′,5′-tri-p-toluoyl-5-fluoro-2′-deoxycytidine separated from toluene solution in the form of crystals. These crystals were removed by filtration and the toluene solution was evaporated to a syrup. This syrup, on treating with boiling methanol, yielded an additional crop of crystals. There was obtained a total yield of 20.2 grams of N,3′,5′-tri-p-toluoyl-5-fluoro-2′-deoxycytidine melting at 215° C.

The methanol mother liquor was then evaporated and the residue was dissolved in 80 ml. of carbon tetrachloride. Wax-like crystals separated from solution. After trituration with 75 ml. of ether, these crystals were recovered by filtration. The product was purified by boiling with 225 ml. of boiling methanol. A yield of 7.5 grams of clustered needles, melting at 152–153° C., was obtained. This product was recrystallized from 80 volumes of ethanol to yield the 1-α-D-(3′,5′-di-O-toluoyl-N-toluoyl-2′-deoxyribofuranosyl)-5-fluorocytosine, melting at 152.5–153° C. $[\alpha]_D^{24} = -133°$. (c. 0.5 in dimethylformamide.)

$\lambda_{max.}^{EtOH}$ 242–3, 330 mμ (ξ 39,200, 12,960). $\lambda_{min.}^{EtOH}$ 219, 295 mμ (ξ 19,000, 7,650). $\lambda_{max.}^{CH_2Cl_2}$ 243, 334 mμ (ξ 37,500, 28,200). $\lambda_{min.}^{CH_2Cl_2}$ 291 mμ (ξ 9,200).

The product analyzed as follows:
Calculated for $C_{33}H_{30}FN_3O_7$: C, 66.10; H, 5.04; F, 3.17; N, 7.0. Found: C, 66.54; H, 5.33; F, 3.27; N, 6.42.

EXAMPLE 3

This example is included to demonstrate a method by which 1-α-D-(3′,5′-di-O-toluoyl-N-toluoyl-2′-deoxyribofuranosyl)-5-fluorocytosine is converted into 1-α-D-2′-deoxyribofuranosyl-5-fluorocytosine, i.e., the α-anomer of 5-fluoro-2′-deoxycytidine.

In this example, 559 mg. of 1-α-D-(3′,5′-di-O-toluoyl-N-toluoyl-2′-deoxyribofuranosyl)-5-fluorocytosine (prepared as described in Example 2) were added to 25 ml. of 6N methanolic ammonia. This was allowed to stand at room temperature for about 24 hours. The solution was thereafter evaporated to dryness, in vacuo, and the residue was refluxed for about 5 minutes in 30 ml. of chloroform. On standing overnight at room temperature, crystallization took place and the crystals were removed by filtration.

There was obtained 214 mg. (84% of theory) of 1-α-D-2′-deoxyribofuranosyl-5-fluorocytosine melting at 182–183° C. After recrystallization from 5 ml. of ethanol, followed by trituration with hot ethanol, the product melted at 186–187° C. $[\alpha]_D^{25} = -92°$. (c. 1.0 in water).

$\lambda_{max.}^{0.1NHCl}$ 291 mμ (ξ 12,000). $\lambda_{min.}^{0.1NHCl}$ 241 mμ (ξ 1,330).

*Analysis.*—Calculated for $C_9H_{12}FN_3O_4$: F, 7.75. Found: F, 7.57.

EXAMPLE 4

(A) This example is included to demonstrate means, other than that described in Example 1, by which N,3′,5′-tri-p-toluoyl-5-fluoro-2′-deoxycytidine can be deacylated.

In this example, a suspension of 3 grams of N,3′,5′-tri-p-toluoyl-5-fluoro-2′-deoxycytidine (5.36 millimole) in 50 ml. of methanol was heated at reflux temperatures. There was added to the reaction system, drop by drop, 6 ml. of 6.45 N lithium methoxide. During the addition of the latter, the temperature of the reaction mixture was maintained within the range of from about 50–55° C. After about 50 minutes at this temperature, a solution was obtained and substantial absence of absorption at 320 mμ was noted after heating for about 5 hours at that temperature. At the end of 5 hours, the solution was neutralized with alcoholic hydrochloric acid and it was subsequently clarified using celite and charcoal. The solution was subsequently evaporated to a syrup and a crystalline product was obtained from the syrup using a mixture of 10 ml. of ethanol, 10 ml. of methanol and 25 ml. of ether.

There was obtained 0.91 gram (69.4% of theory) of 5-fluoro-2′-deoxycytidine. Upon subsequent recrystallization of the product, first from butanol and then from ethanol, there was obtained 5-fluoro-2′-deoxycytidine melting at 196–197° C.

(B) To demonstrate still another method for deacylating, N,3′,5′-tri-p-toluoyl-5-fluoro-2′-deoxycytidine (10.71 grams) was suspended in 170 ml. of ethanol containing 15% of ammonia. This mixture was stirred at room temperature for a period of about 16 hours. Thereafter, 330 ml. of methanol were added to the reaction mixture. While being stirred, the mixture was saturated under ice cooling with ammonia and allowed to stand for an additional 20-hour period. The solution, thus obtained, was clarified using fuller's earth and charcoal. Analysis thereof revealed that it contained only $$E_{320}^{0.1\,NaOH} = 1250$$

(0.3% N-toluoyl-5-fluoro-2′-deoxycytidine) and upon evaporation this solution yielded a dry crystalline powder which, when dehydrated with 80 ml. of boiling ethanol, yielded 2.33 grams of 5-fluoro-2′-deoxycytidine melting at 193.5–195° C. when cooled and upon addition of 80 ml. of ether.

Further addition of ether to the mother liquor and the subsequent evaporation of the solution to dryness and trituration of the residue with 100 ml. of boiling butyl acetate produced an additional crop of the crystalline 5-fluoro-2′-deoxycytidine. The total yield obtained was 4.21 grams or 89.7% of theory.

Example 5

*Preparation of N-p-toluoyl-5-fluoro-2′-deoxycytidine*

In this example, 1.12 grams (0.002 mole) of N,3′,5′-tri-p-toluoyl-5-fluoro-2′-deoxycytidine (prepared as described in Example 1) were suspended in 30 ml. of methanol containing a few drops of phenolphthalein. To this suspension, 2 ml. of 1 N sodium methoxide was added. The mixture was shaken for a period of about 20 minutes, following which an additional 2 ml. of 1 N sodium methoxide was added thereto. The mixture was thereafter allowed to stand at a temperature of about 3° C. for a period of about 16 hours. Subsequent neutralization of the product with methanolic hydrochloric acid (0.0026 mole of hydrochloric acid), followed by evaporation, yielded a syrup which, upon trituration with 50 ml. of ether, formed crystals. The crystalline product was separated by centrifugation, washed with ether and subsequently taken up in 15 ml. of water. Upon standing, crystals were deposited which were removed by filtration, and washed with water and then with ethanol. The filtrate, after neutralization with 0.7 ml. of 1 N hydrochloric acid, yielded a second crop of crystals. The total yield of crystalline product obtained was 0.41 gram (56.5% of theory). The product softened at 188–189° C., resolidified and then melted at 217–218° C.

Upon crystallization 0.3 gram of the product from 15 ml. of water and 5 ml. of ethanol, there was obtained 0.27 gram of N-p-toluoyl-5-fluoro-2′-deoxycytidine, in the form of long needles melting at 218–219° C.

$\lambda_{max.}^{EtOH}$ 265, 329 mμ (ξ 16,800, 17,900). $\lambda_{min.}^{EtOH}$ 236, 294 mμ (ξ 8,600, 8,700). $\lambda_{max.}^{0.1\,NaOH}$ 245, 320 mμ (ξ 11,440, 22,380). $\lambda_{min.}^{0.1\,NaOH}$ 235, 260 mμ (ξ 11,160, 8,410). $[\alpha]_D^{25} = +90.3°$. (c. 0.4 in dimethylformamide.).

*Analysis.*—Calculated for $C_{17}H_{18}FN_3O_5$: C, 56.19; H, 4.99; F, 5.23; N, 11.57. Found: C, 56.66; H, 5.10; F, 5.18; N, 11.52.

Example 6

*Preparation of N-acetyl fluorocytosine*

12.9 grams of 5-fluorocytosine, 60 ml. of acetic acid and 12 ml. of acetic anhydride were charged into a suitable vessel and heated therein at a temperature of from about 110–115° C. At the end of about 5 minutes of heating all of the reactants had dissolved. The product was allowed to cool to room temperature and, upon cooling, crystallization occurred. The crystalline product was removed from the reaction system by filtration, and it was dried to constant weight at a temperature of about 80° C. There was obtained 17.1 grams of N-acetyl fluorocytosine (100% of theory) melting at 235–237° C. with decomposition.

*Analysis.*—Calculated for $C_6H_6N_3O_2F$: C, 42.1; H, 3.5. Found: C. 42.24; H, 3.80.

*Preparation of N-acetyl-3′,5′-di-p-toluoyl-5-fluoro-2′-deoxycytidine*

A solution of 17.1 grams of acetyl fluorocytosine in 200 ml. of dimethylformamide was obtained by moderately heating the mixture on a steam bath. This solution was added to a solution of 32.0 grams of mercuric acetate dissolved in 130 ml. of dimethylformamide. Prior to addition of the acetyl fluorocytosine solution thereto, the mercuric acetate solution had been cooled to a temperature of about 0° C. Addition of the fluorocytosine solution to the mercuric acetate solution was carried out at such a rate that the temperature of the reaction mixture did not exceed about 20° C. The reaction mixture was stirred at a temperature of from about 0–10° C. for about 10 minutes after the addition of acetyl fluorocytosine solution had been completed.

Thereafter, 300 ml. of absolute ether were added to the mixture and the precipitate which formed was collected by filtration. The precipitate was subsequently washed, first with 100 ml. of absolute ether and then with 100 ml. of toluene.

The undried material was suspended in 500 ml. of toluene with constant stirring and 80.0 grams of 3′,5′-di-O-p-toluoyl-D-2′-deoxyribofuranosyl chloride were added thereto. The reaction mixture was stirred at a temperature within the range of from about 20–25° C. for a period of about 1 hour. At the end of that time 200 ml. of a saturated solution of sodium chloride and 1.0 gram of sodium bicarbonate were added to the reaction mixture and stirred therewith vigorously for about 15 minutes. A two-phase system was thus obtained. The toluene layer was separated and it was shaken with 100 ml. of a saturated sodium chloride solution and, thereafter, the toluene solution was evaporated to dryness in vacuo. The residual syrup, thus obtained, was diluted with 20 ml. of ethyl acetate and 200 ml. of ether, seeded and allowed to crystallize. Crystallization appeared to be complete in a period of about 12 hours. The crystals, thus formed, were filtered and washed with ether. There was obtained 39.5 grams (75% of theory) of N-acetyl-3′,5′-di-p-toluoyl-5-fluoro-2′-deoxycytidine melting at 155–162° C. $[\alpha]_D^{25} = -60°$ (1% DFA).

*Isolation of the β-anomer of N-acetyl-3′,5′-di-p-toluoyl-5-fluoro-2′-deoxycytidine*

30.0 grams of N-acetyl-3′,5′-di-p-toluoyl-5-fluoro-2′-deoxycytidine obtained by the procedure described in the preceding paragraph were slurried with 45 ml. of pyridine and 45 ml. of acetone. The mixture was stirred for about 30 minutes, following which the undissolved materials present therein were removed by filtration. This material was thereafter washed using 10 ml. of acetone.

There was obtained 12.5 grams of the β-anomer of N-acetyl-3′,5′-di-p-toluoyl-5-fluoro-2′-deoxycytidine melting at 197° C. $[\alpha]_D^{25} + 32.0(\pm 0.5°)$. After recrystallization from butanol, the product analyzed as follows:

Calculated for $C_{27}H_{26}O_7N_3F$: C, 61.94; H, 5.01; N, 8.41. Found: C, 61.86; H, 5.24; N, 8.12.

*Preparation of 5-fluoro-2′-deoxycytidine*

5.24 grams of the β-anomer of N-acetyl-3′,5′-di-p-toluoyl-5-fluoro-2′-deoxycytidine were suspended in 80 ml. of methanol. There was added to this suspension, 15 ml. of a 1 N sodium methoxide solution. The reactants went rapidly into solution. The solution was allowed to stand for 6 hours, following which 15 ml. of 1 N aqueous sulfuric acid was added thereto. The solution was evaporated to dryness and the residue was washed with ether. The residue was subsequently extracted with 100 ml. of hot methanol, filtered and the filtrate was evaporated in vacuo. There was obtained a yield of 2.4 grams (100% of theory) of crystalline β-anomer of 5-fluoro-2′-deoxycytidine, melting at 188–190° C. Recrystallization of the product from 120 ml. of methanol yielded 5-fluoro-2′-deoxycytidine, melting at 195–196° C. $[\alpha]_D^{25} + 76.6°(\pm 0.4°)$ (1% in water).

EXAMPLE 7

*Preparation of N-pivaloyl-5-fluorocytosine*

In this example, a mixture of 13.0 grams of 5-fluorocytosine, 26 ml. of dimethylformamide and 19.0 grams of pivalic acid anhydride was prepared. The mixture was heated, with stirring, to a temperature within the range of from about 110–120° C. At the end of about 15 minutes of heating, the reaction mixture was allowed to cool, and, on cooling, N-pivaloyl-5-fluorocytosine crystallized from solution and it was recovered by filtration. The product, recrystallized from methanol, melted at a temperature of 227–229° C., with decomposition.

The N-pivaloyl-5-fluorocytosine, thus obtained, analyzed as follows:

Calculated for $C_9H_{12}O_2N_3F$: C, 50.6; H, 5:6. Found: C, 50.45; H, 5.81.

*Preparation of N-pivaloyl-3′,5′-di-p-toluoyl-5-fluoro-2′-deoxycytidine*

A mixture of 10.52 grams of pivaloyl-5-fluorocytosine, 16 grams of mercuric acetate and 20 ml. of dimethylformamide was slurried at a temperature within the range of from about 0–5° C. A homogeneous syrup was thus obtained. To this syrup there was added 300 grams of absolute ether, with stirring. A voluminous, amorphous, flaky mercury compound precipitated. The precipitate was collected by filtration and it was washed with 50 ml. of absolute ether.

The product, thus obtained, was thereafter suspended, by stirring, in 500 ml. of toluene. Subsequently, 40.0 grams of 3′,5′-di-O-p-toluoyl-D-2′-deoxyribofuranosyl chloride were added thereto and the mixture was stirred for a period of about 1 hour. The product obtained was worked up in the manner described in Example 3 (for the preparation of N-acetyl-3′,5′-di-p-toluoyl-5-fluoro-2′-deoxycytidine and the isolation of the β-anomer thereof) to obtain 4.0 grams of crystalline β-anomer of N-pivaloyl-3′,5′-di-p-toluoyl-5-fluoro-2′-deoxycytidine, melting at 209° C. $[\alpha]_D^{25} = +21°$ (1% in dimethylformamide).

*Preparation of 5-fluoro-2′-deoxycytidine*

3.3 grams of the β-anomer of N-pivaloyl-3′,5′-di-p-toluoyl-5-fluoro-2′-deoxycytidine were suspended in 70 ml. of methanol. Thereafter, a few drops of alcoholic phenolphthalein solution were added thereto. Subsequently, 1.8 N methyl alcoholic barium methylate was added to the suspension, drop by drop, until the suspension had a lasting red color. The reaction mixture was allowed to stand at a temperature of about 25° C. for a period of about 90 minutes. Thereafter, the solution was neutralized with 1 N sulfuric acid and filtered. The filtrate was worked up in the same manner as in Example 6 (for the preparation of 5-fluoro-2′-deoxycytidine) to yield 1.5 grams of 5-fluoro-2′-deoxycytidine in the form of crystals, melting at 196° C. $[\alpha]_D^{25} = +75°$ (1% in water).

EXAMPLE 8

*Preparation of N-p-nitrobenzoyl-5-fluorocytosine*

A suspension of 12.9 g. (0.10 mole) of 5-fluorocytosine in 200 ml. of anhydrous pyridine and 20.5 g. (0.11 mole) of p-nitrobenzoyl chloride was heated to reflux. The initial suspension cleared rapidly. After 5 hours of refluxing, the solution was cooled, and the resulting crystalline slurry kept at room temperature overnight. To destroy any residual acid chloride, 5 ml. of methanol were added and the suspension stirred for 5 minutes. The solid was removed by filtration, washed with methanol until the last washings were free of Cl⁻ and then dried at 80° C. in vacuo to constant weight. The p-nitrobenzoyl-5-fluorocytosine thus obtained melted at 278° C. with decomposition. For recrystallization the material was dissolved in 235 ml. of boiling dimethylformamide and 400 ml. of water were added to the continually boiling mixture. The resulting crystalline precipitate was removed by filtration of the boiling suspension, washed with boiling water, cold water and methanol. After drying in vacuo at 80° C. to constant weight, the crystalline p-nitrobenzoyl-5-fluorocytosine melted at 280° C. with decomposition.

*Analysis.*—Calculated for $C_{11}H_7FN_4O_4$: N, 20.14; F, 6.83. Found: N, 19.79; F, 6.82.

EXAMPLE 9

*Preparation of N-p-chlorobenzoyl-5-fluorocytosine*

A suspension of 12.9 g. (0.10 mole) of 5-fluorocytosine in 100 ml. of anhydrous pyridine and 19 g. (0.108 mole) of p-chlorobenzoyl chloride was heated to reflux. The initial suspension cleared rapidly. After 5 hours of reflux, the dark red solution was cooled, 5 ml. of methanol were added and the mixture kept at room temperature overnight. The resulting crystalline slurry was filtered, the solid washed free of Cl$^-$ with $H_2O$ and then dried at 75° C. in vacuo to constant weight. The p-chlorobenzoyl-5-fluorocytosine thus obtained melted at 232.5 to 233.5° with gas evolution. For recrystallization the material was dissolved in 100 ml. of warm dimethylformamide and decolorized with charcoal. The warm solution was heated to boiling and water added until the crystalline precipitate no longer dissolved on further heating. After cooling the suspension to room temperature, the solid was removed by filtration, washed with dimethylformamide-water and methanol. After drying to constant weight at 75° C. in vacuo, the crystalline p-chlorobenzoyl-5-fluorocytosine melted at 238–239° C. with decomposition.

*Analysis.*—Calculated for $C_{11}H_7ClFN_3O_2$: Cl, 13.23; F, 7.10; N, 15.70. Found: Cl, 13.45; F, 6.60; N, 15.70.

EXAMPLE 10

*Preparation of N-(4-carboxybenzoyl)-5-fluorocytosine*

A suspension of 1.29 g. (0.01 mole) of 5-fluorocytosine and 2.03 g. (0.011 mole) of p-chloroformylbenzoic acid in 20 ml. of anhydrous pyridine was heated to reflux. The initial suspension cleared rapidly. After 5 hours of reflux, the solution was cooled to room temperature overnight. After the addition of 75 ml. of methanol, the solid was removed by filtration and washed with methanol. The filtrate was concentrated to dryness, slurried with 20 ml. of water and filtered. Crystallization occurred in the filtrate after several days at room temperature. The solid was removed by filtration, washed with water, methanol and ether. The N-(4-carboxybenzoyl)-5-fluorocytosine thus obtained melted at 270° C. with decomposition. For recrystallization the material was dissolved in 7 ml. of hot dimethylformamide, 16 ml. of methanol and 20 ml. of water were added to hot solution. The resulting suspension was cooled to room temperature, the solid removed by filtration and washed with water, methanol and ether. After drying at 110° C. in vacuo to constant weight, the crystalline N-(4-carboxybenzoyl)-5-fluorocytosine melted at 271–272° C. with decomposition.

*Analysis.*—Calculated for $C_{12}H_8FN_3O_4$: C, 51.99; H, 2.91; N, 15.16; F, 6.85. Found: C, 51.84; H, 2.93; N, 15.16; F, 7.03.

EXAMPLE 11

*Preparation of N-p-methoxybenzoyl-5-fluorocytosine*

A suspension of 12.9 g. (0.10 mole) of 5-fluorocytosine and 19 g. (0.11 mole) of p-methoxybenzoyl chloride in 145 ml. of dry pyridine was heated to reflux. The initial suspension cleared rapidly. After 5 hours of reflux, the dark red solution was cooled, 5 ml. of methanol added, and the mixture cooled in an ice bath. The resulting crystals were removed by filtration and washed with water until the last washings were chloride free. After being washed with methanol and ether, the solid was dried to constant weight at 80° C. in vacuo. The p-methoxybenzoyl-5-fluorocytosine thus obtained melted at 254–255° C. with decomposition. For recrystallization, the material was dissolved in 300 ml. of hot dimethylformamide, about 1 g. of Norit A was added, and the suspension filtered through Celite. The hot yellow filtrate was heated to boiling, and water added slowly until the precipitate failed to dissolve on further heating. The suspension was cooled slowly to room temperature, the solid removed by filtration and washed with dimethylformamide-water, methanol and ether. After drying to constant weight in vacuo, the crystalline p-methoxybenzoyl-5-fluorocytosine melted at 260–261° C. with decomposition.

*Analysis.*—Calculated for $C_{12}H_{10}FN_3O_3$: N, 15.96; F, 7.22; $OCH_3$, 11.79. Found: N, 15.82; F, 7.23; $OCH_3$, 11.78.

EXAMPLE 12

*Representative pharmaceutical formulations containing N-p-chlorobenzoyl-5-fluorocytosine*

TABLET FORMULATION

| | Per tablet, mg. |
|---|---|
| N-p-chlorobenzoyl-5-fluorocytosine | 100 |
| Lactose, U.S.P. | 202 |
| Cornstarch, U.S.P. | 80 |
| Amijel BO11* | 20 |
| Calcium stearate | 8 |
| Total weight | 410 |

*A prehydrolyzed food grade cornstarch. Any similar prehydrolyzed cornstarch may be used. Purchased from: Corn Products Company, 10 E. 56th St., New York, N.Y.

*Procedure:*

(1) N-p-chlorobenzoyl-5-fluorocytosine, lactose, corn starch, and Amijel BO11 were blended in a suitable mixer.

(2) The mixture was granulated to a heavy paste with water and the moist mass was passed through a No. 12 screen. It was then dried overnight at 110° F.

(3) The dried granules were passed through a No. 16 screen and transferred to a suitable mixer. The calcium stearate was added and mixed until uniform.

(4) The mixture was compressed at a tablet weight of 410 mg. using tablet punches having a diameter of approximately ⅜". (Tablets may be either flat or biconvex and may be scored if desired.)

CAPSULE FORMULATION

| | Per capsule, mg. |
|---|---|
| N-p-chlorobenzoyl-5-fluorocytosine | 100 |
| Lactose | 83 |
| Cornstarch | 37 |
| Talc | 5 |
| Total weight | 225 |

*Procedure:*

(1) N-p-chlorobenzoyl-5-fluorocytosine, lactose and cornstarch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly. The mixture was then filled into No. 4 hard shell gelatin capsules on a Parke Davis capsulating machine.

SUPPOSITORY FORMULATION

| | Per 1.3 gm. suppository, gm. |
|---|---|
| N-p-chlorobenzoyl-5-fluorocytosine | 0.100 |
| Wecobee M* | 1.155 |
| Carnauba wax | 0.045 |

*E. F. Drew Company, 522 Fifth Ave., New York, N.Y.

*Procedure:*

(1) The Wecobee and the carnauba wax were melted in a suitable size glass-lined container, mixed well and cooled to 45° C.

(2) N-p-chlorobenzoyl-5-fluorocytosine, which had been reduced to a fine powder with no lumps, was added and stirred until completely and uniformly dispersed.

(3) The mixture was poured into suppository molds to yield suppositories having an individual weight of 1.3 gms.

(4) The suppositories were removed from molds and cooled. They were individually wrapped in wax paper for packaging.

TOPICAL CREAM

| | Per 100 Gms. cream, gm. |
|---|---|
| N-p-chlorobenzoyl-5-fluorocytosine | 10.2 |
| Stearic acid | 15.0 |
| Mineral oil, light | 1.5 |
| Span 60[1] | 2.5 |
| Methylparaben U.S.P. | 0.08 |
| Propylparaben U.S.P. | 0.02 |
| Sorbitol solution N.F. | 5.00 |
| Tween 60[2] | 1.69 |
| Distilled Water | 67.5 |

[1] Sorbitan monostearate, Atlas Chemical Company.
[2] Polyoxyethylene soribtan monostearate, Atlas Chemical Co.

*Procedure:*

(1) The stearic acid, mineral oil, Span 60 and methyl and propyl parabens were melted together at approximately 75° C. in a suitable size stainless steel, jacketed kettle with agitator.

(2) A suspension of N-p-chlorobenzoyl-5-fluorocytosine in a solution of Tween 60, sorbitol N.F. and distilled water was added to the melted mixture.

(3) The mixture was stirred at 75° until uniform, and the temperature was gradually reduced with continuous stirring.

(4) When the temperature reached 48° C., the cream was transferred to storage containers.

(5) The cream was packaged in wax-lined, tin tubes (opal glass jars may also be used).

EXAMPLE 13

*Preparation of N-propionyl-5-fluorocytosine*

12.9 g. of fluorocytosine, 50 ml. of dimethylformamide and 13 g. of propionic acid anhydride were heated under stirring to 130–140° for 15 minutes to give a clear solution. Upon cooling, the product, N-propionyl-5-fluorocytosine, crystallized. It was collected by filtration and washed on the filter with little water and alcohol. Melting point: 237–238° dec. The melting point did not change after recrystallization from water.

We claim:
1. N-lower alkanoyl-5-fluorocytosine.
2. N-aroyl-5-fluorocytosine wherein said aroyl moiety is a member selected from the group consisting of benzoyl and benzoyl bearing a lower alkyl, lower alkoxy, halo, trihalomethyl, nitro, carboxy or carbalkoxy substituent.
3. N-p-toluoyl-5-fluorocytosine.
4. N-acetyl-5-fluorocytosine.
5. N-pivaloyl-5-fluorocytosine.
6. N-p-toluoyl-5-fluoro-2'-deoxycytidine.
7. N-p-chlorobenzoyl-5-fluorocytosine.
8. N-lower alkanoyl-3',5'-diaroyl-5-fluoro-2'-deoxycytidine wherein the aroyl moieties are selected from the group consisting of benzoyl and benzoyl bearing a lower alkyl, lower alkoxy, halo, trihalomethyl, nitro, carboxy or carbalkoxy ring substituent.
9. N,3',5' - triaroyl - 5 -fluoro - 2' - deoxycytidine wherein the aroyl moieties are selected from the group consisting of benzoyl and benzoyl bearing a lower alkyl, lower alkoxy, halo, trihalomethyl, nitro, carboxy or carbalkoxy ring substituent.
10. N - lower alkanoyl - 3',5' - di - p - toluoyl - 5-fluoro-2'-deoxycytidine.
11. N - aroyl - 3',5'- di - p - toluoyl - 5 - fluoro - 2'-deoxycytidine wherein the aroyl moiety is a member selected from the group consisting of benzoyl and benzoyl bearing a lower alkyl, lower alkoxy, halo, trihalomethyl, nitro, carboxy or carbalkoxy ring substituent.
12. A process which comprises reacting 5-fluorocytosine with an aroyl halide wherein aroyl represents benzoyl or benzoyl bearing a lower alkyl, lower alkoxy, halo, trihalomethyl, nitro, carboxy or carbalkoxy substituent; reacting the N-mono-aroyl-5-fluorocytosine so produced with a mercury salt to form the mono-mercury salt of said N-mono-aroyl-5-fluorocytosine; reacting said mono-mercury salt with a 3',5'-diaroyl-D-2'-deoxyribofuranosyl halide wherein the aroyl moieties are benzoyl or benzoyl bearing a lower alkyl, lower alkoxy, halo, trihalomethyl, nitro, carboxy or carbalkoxy substituent to produce a mixture of the β-anomer and the α-anomer of N-mono-aroyl - 3',5' - diaroyl - 5 - fluoro - 2' - deoxycytidine; separating said β-anomer from said α-anomer and selectively deacylating the deoxyribofuranosyl moiety of said β-anomer and said α-anomer by separately hydrolyzing same with alkali.
13. A process which comprises reacting 5-fluorocytosine with a lower alkanoic acid anhydride; reacting the N-mono-lower alkanoyl-5-fluorocytosine with a mercury salt to form the mono-mercury salt of said N-mono-lower alkanoyl-5-fluorocytosine; reacting said mono-mercury salt with 3',5'-diaroyl-D-2'-deoxyribofuranosyl halide wherein the aroyl moieties are benzoyl or benzoyl bearing a lower alkyl, lower alkoxy, halo, trihalomethyl, nitro, carboxy or carbalkoxy substituent to produce a mixture containing the β-anomer and the α-anomer of N-mono - lower alkanoyl - 3',5' - diaroyl - 5 - fluoro - 2'-deoxycytidine; separating said β-anomer from said α-anomer and deacylating said β-anomer and said α-anomer by separately hydrolyzing same with alkali.

References Cited by the Examiner

UNITED STATES PATENTS

| 2,949,451 | 8/1960 | Hoffer | 260—211.5 |
| 3,040,026 | 6/1962 | Duschinsky et al. | 260—211.5 |
| 3,208,997 | 9/1965 | Iwai et al. | 260—211.5 |

OTHER REFERENCES

Hoffer et al.: "Jour. Amer. Chem. Soc.," vol. 81, Aug. 5, 1959, pp. 4112–4113.

LEWIS GOTTS, *Primary Examiner.*

JOHNNIE R. BROWN, *Assistant Examiner.*